UNITED STATES PATENT OFFICE.

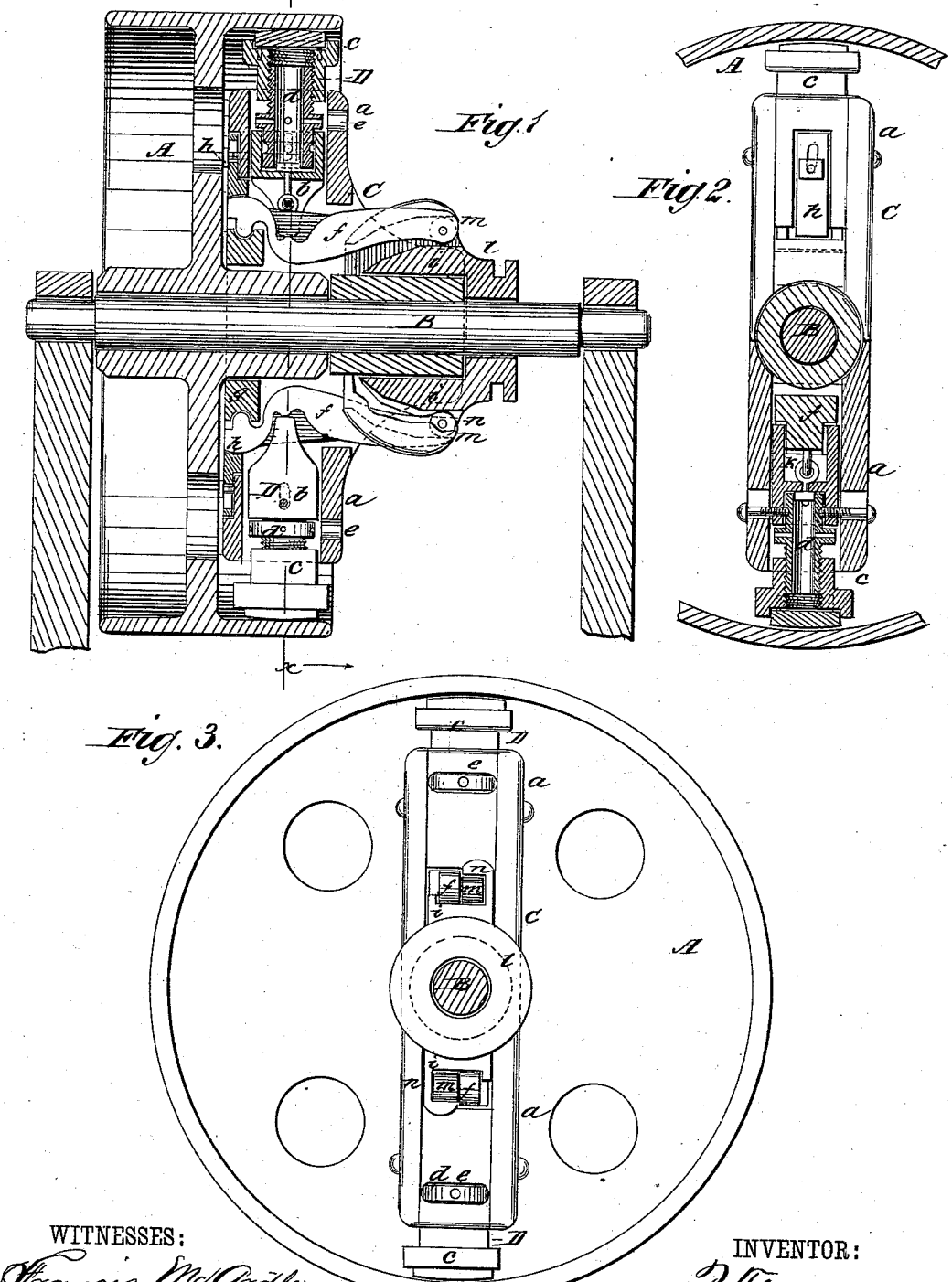

PATRICK FLEMING, OF FAIR HAVEN, CONNECTICUT.

IMPROVEMENT IN FRICTION-CLUTCHES.

Specification forming part of Letters Patent No. 215,343, dated May 13, 1879; application filed March 8, 1879.

*To all whom it may concern:*

Be it known that I, PATRICK FLEMING, of Fair Haven, in the county of New Haven and State of Connecticut, have invented a new and Improved Friction-Clutch, of which the following is a specification.

In the drawings, Figure 1 is a section of the clutch applied to a pulley, the section being on line of the driving-shaft. Fig. 2 is a section transversely of the shaft, and partial rear view. Fig. 3 is a front elevation.

Similar letters of reference indicate corresponding parts.

My improved clutch is intended for use in connection with the rim of a pulley, hoisting-drum, or coupling device; and consists in a hub fitted with radial arms, which are thrown in and out by a wedge-acting sleeve, connected with the hub, as will be more particularly described with reference to the drawings.

A is a pulley, that is loose upon the driving-shaft B. C is a hub, fast upon shaft B, and formed with diametrically-opposed extensions $a$, that sit within the rim of pulley A, and are mortised to receive the radially-moving clamping-arms D, that are operated as hereinafter described. The arms D are similar in construction and operation, and the description will apply to either one.

Each arm D consists of a socket-piece, $b$, and a clamping-piece, $c$, connected together by a screw, $d$, for adjustment of the clamp. The outer end of $c$ is fitted with a block of wood, rubber, or other suitable material, that bears against the inner surface of the pulley-rim to clutch the same.

The screw $d$ is apertured for insertion of a pointed tool in turning it, access to the apertures being had by the slots $e$ in the side of the hub C.

The mortise in $d$, and the socket $b$, that sits in the mortise, are of angular form, to prevent the arm D from turning.

The arm D is sustained by a lever, $f$, that is fulcrumed at $g$, on the inner side of hub C. This lever rests upon its fulcrum-support, and is prevented from rising by the adjustable slide $h$, which is attached to the hub by a screw and nut, which permits disconnection of the lever.

The outer end of $f$ rests upon a wedge, $i$, that projects from a loose sleeve, $l$, on shaft B, outside the hub.

The arm D is supported on $f$ between fulcrum $g$ and wedge $i$, and $f$ is connected to D by a wire shackle, $k$, that projects from piece $b$.

The sleeve $l$ will be operated by a shipper-bar, or by any other desired means, to slide it upon shaft B, and thereby move its wedge-pieces $i$ in and out beneath the levers $f$. The outer end of each lever $f$ is fitted with a friction-roller, $m$, that enters a groove, $n$, in the side of sleeve $l$, which groove is above and coincides with the inclined plane of the wedge, so that the wedge-surface will act in raising the levers, and thereby clamping the pulley, and the upper surface of the grooves will draw the levers $f$ downward.

The wedges $i$ are formed with their inclined plane at two different angles, as shown. From the point a short distance upward the angle is greatest, so as to act quickly and give more clearance, while the wider part of the wedge acts by an inclination at a lesser angle, thereby giving greater power in clutching.

This construction furnishes an effective clutch, and one which may be readily put together and attached.

Having thus fully described my invention, I claim as new and desire to secure by Letters Patent—

1. The combination, with the loose pulley A, of the hub C, fast on shaft, the radially-movable arms, consisting of the socket-screw and clamping-pin $c$, the lever $f$, and the wedge-sleeve $i$ $l$, as and for the purpose specified.

2. In a friction-clutch, the combination, with the hub C, lever $f$, and radial arms D, of the adjustable slide $h$, as and for the purposes specified.

3. The combination, with the hub C, arms D, and lever $f$, of the sliding sleeve $l$, provided with wedges $i$ and inclined groove $n$, substantially as and for the purposes set forth.

4. The combination in a friction-clutch, with the clamping-arms D and their operating-levers $f$, of wedges $i$, having inclined planes that vary in angle, as and for the purposes set forth.

PATRICK FLEMING.

Witnesses:
JAMES REILLY,
WM. W. MORSE.